US009428257B2

(12) United States Patent
Nelson

(10) Patent No.: US 9,428,257 B2
(45) Date of Patent: Aug. 30, 2016

(54) EXTENDED ENDURANCE AIR VEHICLE

(71) Applicant: William Edmund Nelson, San Diego, CA (US)

(72) Inventor: William Edmund Nelson, San Diego, CA (US)

(*) Notice: Subject to any disclaimer, the term of this patent is extended or adjusted under 35 U.S.C. 154(b) by 35 days.

(21) Appl. No.: 14/485,685

(22) Filed: Sep. 13, 2014

(65) Prior Publication Data

US 2015/0076279 A1 Mar. 19, 2015

Related U.S. Application Data

(60) Provisional application No. 61/879,421, filed on Sep. 18, 2013.

(51) Int. Cl.
| | | |
|---|---|---|
| *B64B 1/02* | (2006.01) |
| *B64B 1/10* | (2006.01) |
| *B64B 1/12* | (2006.01) |
| *B64B 1/20* | (2006.01) |
| *B64B 1/22* | (2006.01) |
| *B64B 1/28* | (2006.01) |
| *B64B 1/32* | (2006.01) |
| *B64B 1/34* | (2006.01) |
| *B64B 1/58* | (2006.01) |

(52) U.S. Cl.
CPC . *B64B 1/02* (2013.01); *B64B 1/10* (2013.01); *B64B 1/12* (2013.01); *B64B 1/20* (2013.01); *B64B 1/22* (2013.01); *B64B 1/28* (2013.01); *B64B 1/32* (2013.01); *B64B 1/34* (2013.01); *B64B 1/58* (2013.01); *B64B 2201/00* (2013.01)

(58) Field of Classification Search
CPC ....... B64B 2201/00; B64B 1/02; B64B 1/24; B64B 1/30; B64B 1/32; B64B 1/58
See application file for complete search history.

(56) References Cited

U.S. PATENT DOCUMENTS

| | | |
|---|---|---|
| 510,492 A | 12/1893 | Sumvoski |
| 1,677,962 A * | 7/1928 | Finley ................ B64B 1/58 244/73 R |
| 2,616,509 A | 11/1952 | Thomas |
| 2,778,585 A | 1/1957 | Tschudy |
| 2,886,265 A | 5/1959 | Ritter et al. |
| 3,463,420 A | 8/1969 | Butler |
| 3,957,232 A | 5/1976 | Sebrell |

(Continued)

FOREIGN PATENT DOCUMENTS

| | | |
|---|---|---|
| EP | 1457313 B1 | 8/2007 |
| EP | 2687435 A2 | 1/2014 |

*Primary Examiner* — Tien Dinh
*Assistant Examiner* — Alexander V Giczy
(74) *Attorney, Agent, or Firm* — Roeder & Broder LLP; Steven G. Roeder

(57) ABSTRACT

An air vehicle comprises a vehicle body and a propulsion assembly. The vehicle body has the shape of a wing airfoil to generate lift when air flows over the vehicle body. The vehicle body has a body longitudinal axis and substantially planar port and starboard sides of composite material, and includes first and second hulls that are secured together side-by-side, the hulls having longitudinal axes that are substantially parallel to the body longitudinal axis and two substantially planar side walls at least one of which is of composite material. Each hull defines a separate fluid chamber that is filled with a fluid that is at least partially buoyant. The propulsion assembly is secured to the vehicle body port and starboard sides. The propulsion assembly includes port front and rear engines and starboard front and rear engines, wherein at least two of the engines have independently controlled thrust vectors.

19 Claims, 8 Drawing Sheets

(56) References Cited

U.S. PATENT DOCUMENTS

| | | |
|---|---|---|
| 4,149,688 A | 4/1979 | Miller, Jr. |
| 4,261,534 A | 4/1981 | Roselli |
| 5,005,783 A | 4/1991 | Taylor |
| 5,026,003 A * | 6/1991 | Smith ............. B64B 1/60 244/127 |
| 6,196,498 B1 | 3/2001 | Eichstedt et al. |
| 6,293,493 B1 | 9/2001 | Eichstedt et al. |
| 6,540,178 B1 | 4/2003 | Hillsdon |
| 6,783,096 B2 | 8/2004 | Baldwin |
| 7,093,789 B2 | 8/2006 | Barocela et al. |
| 7,137,592 B2 | 11/2006 | Barocela et al. |
| 7,306,187 B2 | 12/2007 | Lavan |
| 7,875,795 B2 | 1/2011 | Liggett |
| 8,109,462 B2 | 2/2012 | Balaskovic |
| 8,177,161 B2 | 5/2012 | Morehead et al. |
| 8,297,550 B2 | 10/2012 | Balaskovic |
| 8,418,952 B2 | 4/2013 | Balaskovic |
| 8,439,294 B2 | 5/2013 | Im |
| 8,459,589 B2 | 6/2013 | Barnes et al. |
| 8,616,503 B2 | 12/2013 | Balaskovic |
| 2002/0106966 A1 | 8/2002 | Jimenez et al. |
| 2003/0001044 A1 * | 1/2003 | Munk ............. B60V 3/08 244/24 |
| 2003/0094537 A1 | 5/2003 | Austen-Brown |
| 2005/0211845 A1 * | 9/2005 | Perry ............. B64B 1/02 244/125 |
| 2005/0269441 A1 * | 12/2005 | Barocela ............. B64B 1/06 244/25 |
| 2007/0063099 A1 | 3/2007 | Holloman, Jr. |
| 2009/0065631 A1 | 3/2009 | Zha |
| 2010/0001128 A1 * | 1/2010 | Morehead ............. B60V 3/08 244/100 A |
| 2010/0185346 A1 * | 7/2010 | Surmont ............. B64B 1/06 701/4 |
| 2010/0224722 A1 * | 9/2010 | Colting ............. B64B 1/30 244/51 |
| 2010/0230533 A1 * | 9/2010 | Greiner ............. B60V 3/08 244/97 |
| 2011/0057074 A1 | 3/2011 | Woodworth et al. |
| 2011/0240794 A1 * | 10/2011 | Hariri ............. B64B 1/06 244/30 |
| 2012/0248259 A1 | 10/2012 | Page et al. |
| 2013/0206921 A1 | 8/2013 | Paduano et al. |
| 2014/0158819 A1 * | 6/2014 | Tixier ............. B64B 1/005 244/30 |

* cited by examiner

EXTENDED ENDURANCE AIR VEHICLE

RELATED APPLICATION

This application claims priority on U.S. Provisional Application Ser. No. 61/879,421, filed Sep. 18, 2013 and entitled "EXTENDED ENDURANCE AIR VEHICLE". As far as permitted, the contents of U.S. Provisional Application Ser. No. 61/879,421 are incorporated herein by reference.

BACKGROUND

Lighter-than-air vehicles have seen significant use since the Montgolfier brothers' 1783 first successful manned hot air balloon flight. The designs included various methods to carry the payload (e.g., pilot, passengers, equipment, etc.), a heating device to create an air envelope that is lighter than the surrounding air, and a container to hold the air. Navigation of these balloons encountered problems with no direct controls to compensate for wind.

The concept evolved to include propulsion, controls, and navigational devices. These devices enabled the air vehicle to navigate and perform specific missions. For example, in certain applications, the air vehicle can be utilized for monitoring a surface environment. Such air vehicles can span the range from rigid (zeppelin) to non-rigid (blimp) and may include aspects of each in any design.

Unfortunately, previously existing designs for the air vehicles still leave numerous areas for improvement in control and operation of the air vehicle.

SUMMARY

The present invention is directed toward an extended endurance air vehicle (also referred to herein simply as an "air vehicle") including a vehicle body and a propulsion assembly. In various embodiments, the vehicle body has the shape of a wing airfoil so that the vehicle body generates lift when air flows over the vehicle body. Additionally, in such embodiments, the vehicle body has a body longitudinal axis. Further, the vehicle body includes a first hull having a first hull longitudinal axis and a second hull having a second hull longitudinal axis. The hulls are positioned side-by side and are secured together. In some embodiments, each of the first hull longitudinal axis and the second hull longitudinal axis are substantially parallel to the body longitudinal axis. Additionally, each hull defines a fluid chamber that is filled with a fluid that is at least partially buoyant. The propulsion assembly is secured to the vehicle body. The propulsion assembly generates thrust to better enable the vehicle body to be moved as desired in a controlled manner. For example, in certain embodiments, the propulsion assembly includes a port front engine, a port rear engine, a starboard front engine, and a starboard rear engine, wherein at least two of the engines have independently controlled thrust vectors. In one such embodiment, each of the engines has independently controlled thrust vectors.

This invention relates to the special purpose, aerodynamically-shaped, remotely controlled, extended endurance air vehicle (E2AV) that can, in one non-exclusive embodiment, operate in relatively close proximity to the ground and in direct line of sight of the operator. Alternatively, the air vehicle, as described in detail herein, can also operate beyond the line of sight of the operator. More particularly, the disclosure relates to the neutrally, or slightly negatively, buoyant lighter-than-air air vehicle design and operational uses. In one non-exclusive application, the present invention is directed to an extended endurance air vehicle for use in monitoring the surface environment with an initiative user interface and the potential option to generate power onboard to support extended operations. For example, a 400 foot altitude, with modern high data rate, low weight sensors can provide significant information for news media coverage or local sporting events. The vehicle design allows it to be easily operated under amateur radio controlled aircraft restrictions with growth to upscale vehicles and national airspace certification. Additionally, the air vehicle is naturally scalable for enhanced payloads and altitudes as described in this application.

Additionally, the present invention is further directed toward a method for forming an air vehicle, and an air vehicle that is remotely controlled by a user.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures and components have not been described in detail so as to not unnecessarily obscure aspects of the described embodiments.

Figure 1A:
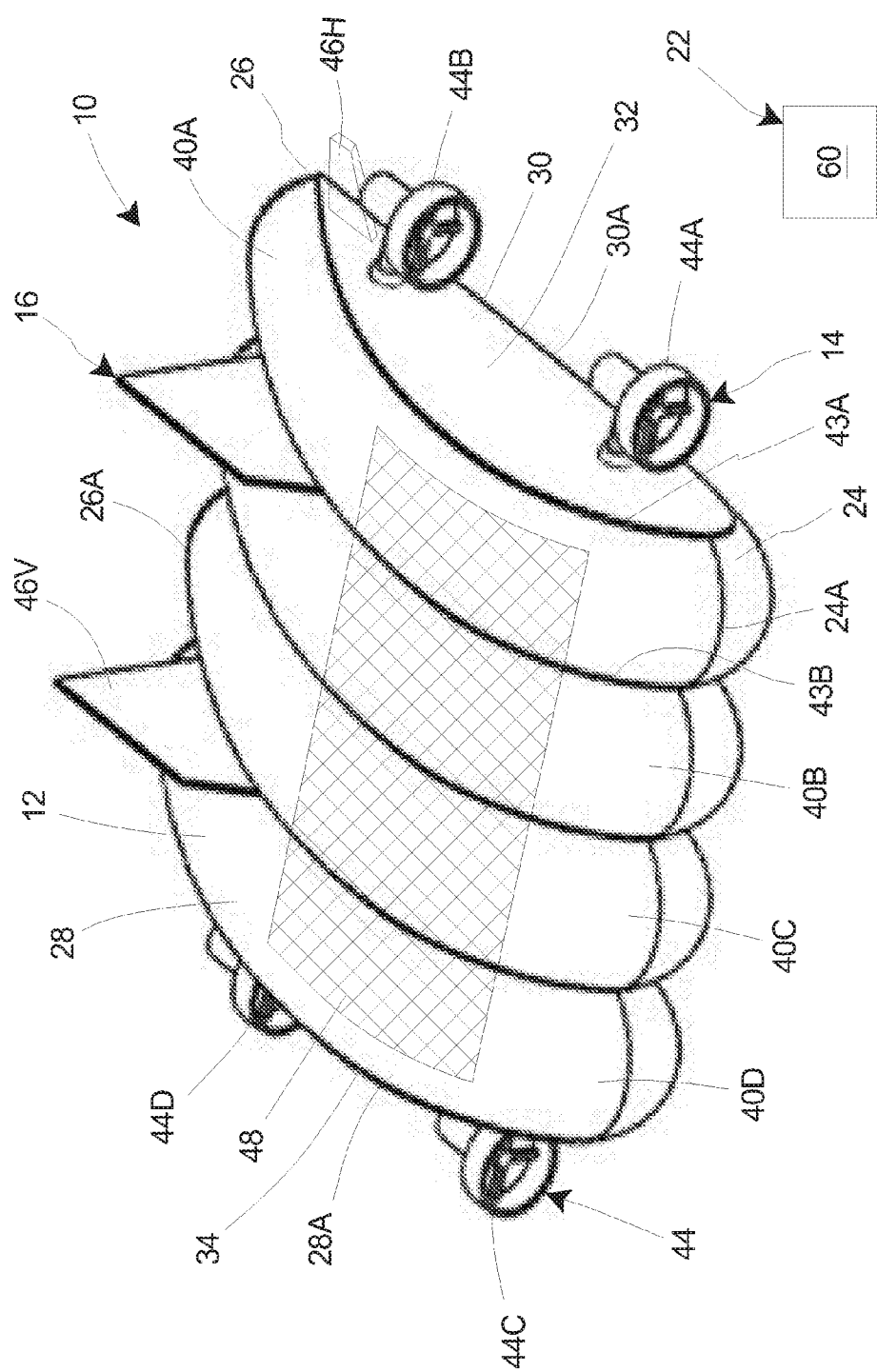
FIG. 1A is a simplified schematic perspective view illustration of an embodiment of an extended endurance air vehicle having features of the present invention.
Figure 1B:
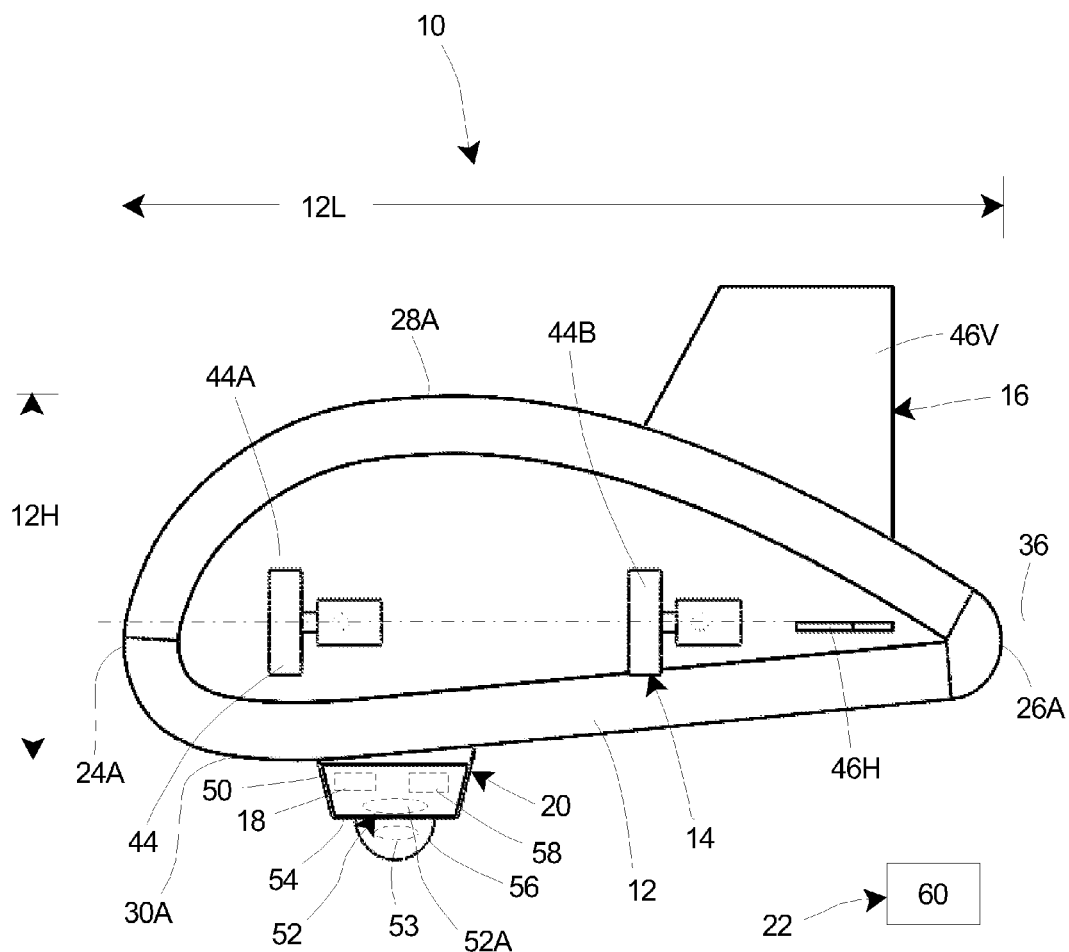
FIG. 1B is a simplified schematic side view illustration of the extended endurance air vehicle illustrated in FIG. 1A.
Figure 1C:
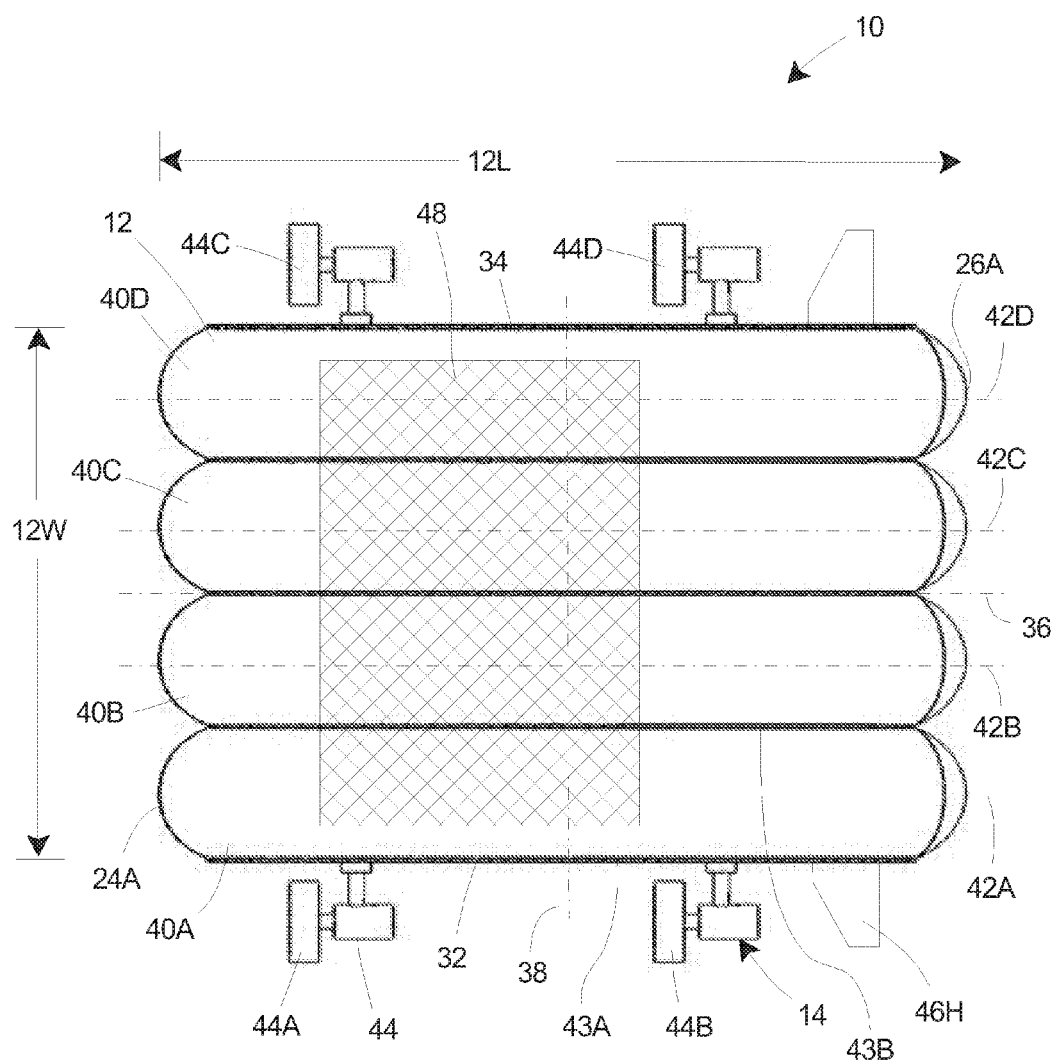
FIG. 1C is a simplified schematic top view illustration of the extended endurance air vehicle illustrated in FIG. 1A.
Figure 1D:
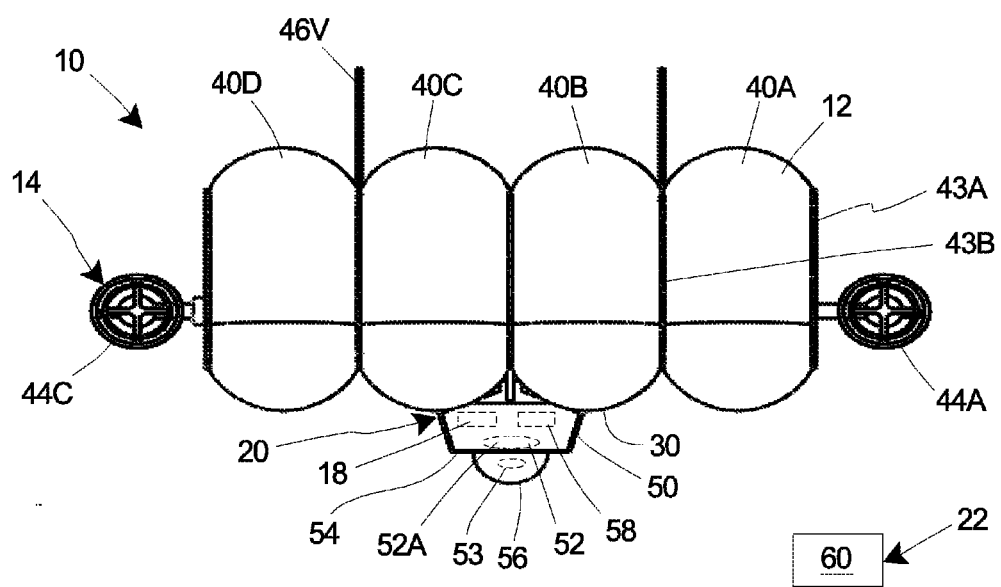
FIG. 1D is a simplified schematic front view illustration of the extended endurance air vehicle illustrated in FIG. 1A.
Figure 1E:
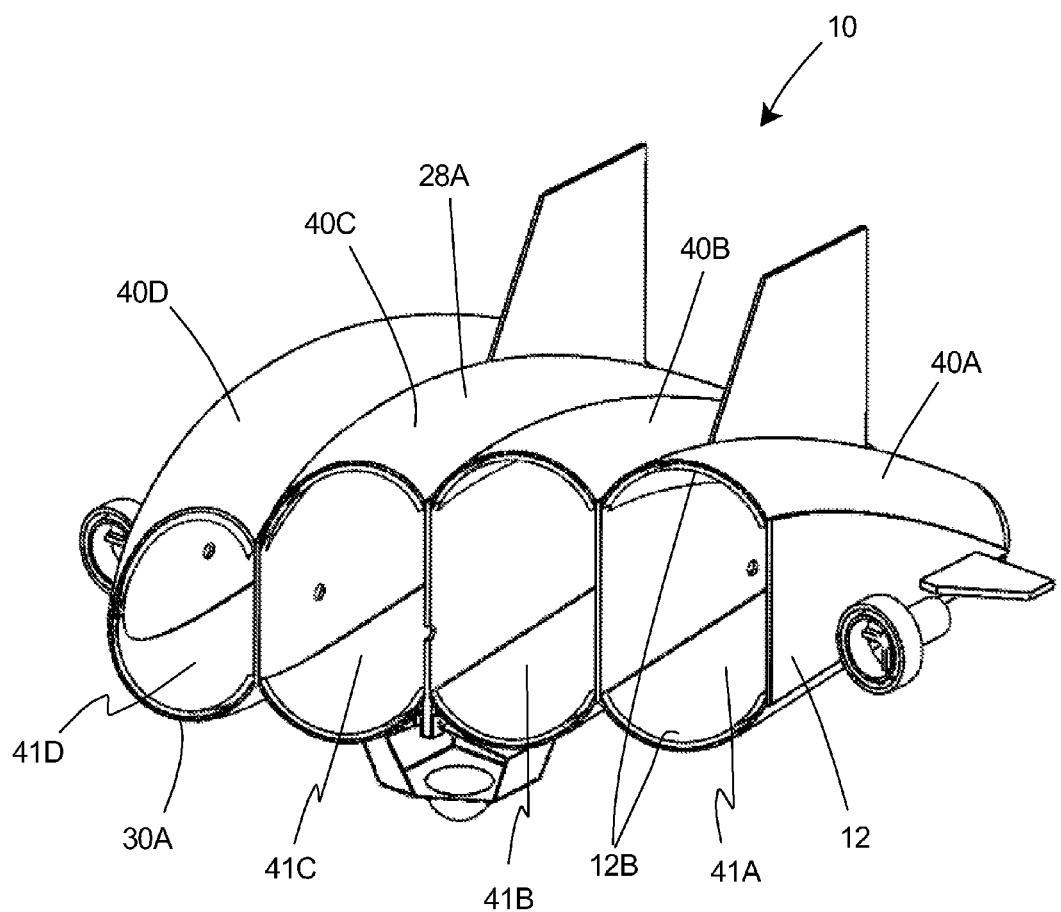
FIG. 1E is a cutaway view of the extended endurance air vehicle illustrated in FIG. 1A.

FIGS. 1A-1E provide alternative simplified schematic view illustrations of an embodiment of an extended endurance air vehicle 10 (also referred to herein simply as an "air vehicle") having features of the present invention. More specifically, FIG. 1A is a simplified schematic perspective view illustration of the extended endurance air vehicle 10; FIG. 1B is a simplified schematic side view illustration of the extended endurance air vehicle 10; FIG. 1C is a simplified schematic top view illustration of the extended endurance air vehicle 10; FIG. 1D is a simplified schematic front view illustration of the extended endurance air vehicle 10, and FIG. 1E is a cutaway view of the extended endurance air vehicle 10 illustrated in FIG. 1A.

A number of Figures include an orientation system that illustrates an X axis, a Y axis that is orthogonal to the X axis, and a Z axis that is orthogonal to the X and Y axes. It should be understood that the orientation system is merely for reference and can be varied. Moreover, it should be noted that any of these axes can also be referred to as the first, second, and/or third axes.

The specific design of the air vehicle 10 can be varied as desired. In the embodiment illustrated in the Figures, the air vehicle 10 comprises a vehicle body 12, a propulsion assembly 14, a stabilizer assembly 16, a power assembly 18 (illustrated, for example, in FIG. 1B), a payload assembly 20 (illustrated, for example, in FIG. 1B), and a control assembly 22. Alternatively, the air vehicle 10 can be designed to include more components or fewer components than those specifically illustrated and described herein. For example, in one non-exclusive alternative embodiment, the air vehicle 10 can be designed without the stabilizer assembly 16.

As an overview, in certain embodiments, the air vehicle 10 is uniquely designed to enable improved operational capabilities, e.g., takeoff, in-flight control and maneuvering, and recovery, as compared to previous air vehicles. More particularly, the vehicle body 12 is designed to have a shape that, when combined with the specific positioning and operation and the propulsion assembly 14, enables smooth and easy takeoff, precise control and maneuvering during in-flight operations, and easy recovery for the air vehicle 10.

The design of the vehicle body 12 can be varied to suit the specific requirements of the air vehicle 10. In one embodiment, as shown in FIG. 1A, the vehicle body 12 is non-rigid and is formed in the shape of a wing airfoil so that the vehicle body 12 generates lift, e.g., at very slow speeds, when air flows over the vehicle body 12. More particularly, in this embodiment, the wing airfoil shape of the vehicle body 12 includes a rounded, leading edge 24, a sharp, trailing edge 26, and an upper surface 28 and a lower surface 30 having asymmetric curvature so as to better enable the vehicle body 12 to generate lift, even at very slow speeds, when air flows over the vehicle body 12. Additionally, the vehicle body 12 can also be described as including a body front 24A (which generally coincides with and/or comprises at least a portion of the leading edge 24), a body rear 26A (which generally coincides with and/or comprises at least a portion of the trailing edge 26), a body top 28A (which generally coincides with and/or comprises at least a portion of the upper surface 28), and a body bottom 30A (which generally coincides with and/or comprises at least a portion of the lower surface 30). Alternatively, the vehicle body 12 can be designed with a different shape.

The specific wing airfoil shape of the vehicle body 12 is selected to produce lift at very slow speeds, e.g., substantial enough to produce sufficient lift in a nominal breeze sufficient for station keeping, allowing positive contribution from very slow speed take-off through on-station monitoring and recovery. In one non-exclusive alternative embodiment, the initial shape of the vehicle body 12 may be a modified version of a Clark Y 11.7% NACA airfoil.

Additionally, in this embodiment, the vehicle body 12 further includes a port side 32, a starboard side 34, a body longitudinal axis 36 (illustrated, for example, in FIG. 1C) and a body transverse axis 38 (illustrated in FIG. 1C).

Further, as shown in FIG. 1A, the vehicle body 12 includes a plurality of hulls, e.g., a first hull 40A, a second hull 40B, a third hull 40C and a fourth hull 40D, that are positioned directly adjacent to one another and are secured to one another in a side-by-side manner. Alternatively, the vehicle body 12 can include greater than four or fewer than four hulls.

Each hull 40A-40D defines a separate fluid chamber 41A-41D (illustrated in FIG. 1E) that is adapted to be filled with a fluid (not shown) in order to achieve a desired buoyancy for the vehicle body 12. For example, the desired buoyancy for the vehicle body 12 can be achieved through using a lighter-than-air gas such as helium or hydrogen within each of the hulls 40A-40D of the vehicle body 12, or other methods such as heated air similar to what is commonly used in a hot-air balloon. In one embodiment, the desired buoyancy is anticipated to be slightly negative to enhance safety. Thus, in the event of power interruption, the air vehicle 10 will gracefully descend to the ground. As provided herein, the slight negative buoyancy of the vehicle body 12 can be easily compensated for by the vehicle shape and propulsion assembly 14, with additional lift being provided by the forward velocity generated by the propulsion assembly 14. In alternative, non-exclusive embodiments, the air vehicle 10 is designed so that the fluid chambers 41A-41D (via the fluid) provide lift so that the air vehicle 10 is approximately 75, 80, 85, 90, or 95 percent buoyant. Alternatively, the air vehicle 10 can be designed so that the fluid chambers 41A-41D (via the fluid) provide lift so that the air vehicle 10 can be operated from zero to 100 percent buoyant. The vehicle body 12 can be filled with another suitable fluid that enables the vehicle body 12 to achieve the desired buoyancy.

Moreover, the lighter-than-air gas within the hulls 40A-40D of the vehicle body 12 can be provided at a sufficient pressure such that the vehicle body 12 maintains its shape and proper operational capabilities. Stated in another manner, since the vehicle body 12 can be designed with a non-rigid structure, in such embodiments the lighter-than-air gas should be provided at a sufficient pressure such that the vehicle body 12 does not collapse in on itself and/or does not lose steering or speed control capabilities. Further, it should also be appreciated that the pressure of the lighter-than-air gas in the vehicle body 12 must not be too great so as to over-expand the vehicle body 12. It should also be appreciated that in order to effectively withstand the pressure of the fluid within the vehicle body 12, the vehicle body 12 must be formed from a material having sufficient strength characteristics. For example, in certain embodiments, the vehicle body 12, i.e. an outer skin of the vehicle body 12, can be formed from high strength-to-weight ratio, low gas permeability, flexible composite laminates. Alternatively, the outer skin of the vehicle body 12 can be formed from another suitable material.

Additionally and/or alternatively, in some embodiments, internal structures may be utilized within the vehicle body 12 to ensure that the desired shape of the vehicle body 12 is effectively maintained, e.g., during movement between altitudes of differing ambient pressure. For example, in one non-exclusive alternative embodiment, the outer skin of the vehicle body 12 can be maintained in a rigid state during transition from higher altitude (lower ambient pressure) to lower altitude (higher ambient pressure) through inclusions of a secondary air bladder 12B (illustrated in FIG. 1E) inside the vehicle body 12 and substantially adjacent to the vehicle body 12 that can be inflated by an electronic motor fan assembly (not illustrated).

The multi-hull, multi-chamber design of the vehicle body 12 is designed to improve safety, as well as providing aerodynamic benefits. For example, in one non-exclusive embodiment, each of the hulls 40A-40D can be approximately the same size, and thus each of the hulls 40A-40D can be designed to contain roughly the same volume of lighter-than-air gas. The use of multiple, independent chambers allows for the graceful loss of lift in the event of a rip or puncture in one of the hulls 40A-40D. More specifically, in the event of such a rip or puncture, this design of the air vehicle 10 still enables a controlled descent to the ground at a reduced buoyancy descent rate. Moreover, the aerodynamic shape of the vehicle body 12 in conjunction with the design and positioning of the propulsion assembly 14 may be capable of overcoming this reduced buoyancy.

Alternatively, one or more of the hulls 40A-40D can differ in size and/or shape as compared to the other hulls 40A-40D. For example, in one non-exclusive alternative embodiment, each of the outermost hulls, i.e. the first hull 40A and the fourth hull 40D in this embodiment, may have a size and/or shape that is different (larger or smaller) than those of the inner hulls, i.e. the second hull 40B and the third hull 40C in this embodiment.

Referring now to FIG. 1B, this Figure illustrates that the vehicle body 12 can also be defined as including a body length 12L, which measures the distance between the body front 24A and the body rear 26A, and a body height 12H, which measures the maximum distance between the body top 28A and the body bottom 30A. The specific measurements for the body length 12L and the body height 12H can vary. For example, in certain embodiments, the body length 12L can vary between approximately 2.0 feet and 50.0 feet, and the body height 12H can vary between approximately 0.6 feet and 15.0 feet. More particularly, (i) in a first embodiment, the vehicle body 12 can have a body length 12L of approximately 2.0 feet and a body height 12H of approximately 0.6 feet; (ii) in a second embodiment, the vehicle body 12 can have a body length 12L of approximately 5.0 feet and a body height 12H of approximately 1.5 feet; (iii) in a third embodiment, the vehicle body 12 can have a body length 12L of approximately 15.0 feet and a body height 12H of approximately 4.5 feet; and (iv) in a fourth embodiment, the vehicle body 12 can have a body length 12L of approximately 50.0 feet and a body height 12H of approximately 15.0 feet. In each of such embodiments, the ratio of body length 12L to body height 12H is approximately 10:3. Alternatively, the body length 12L can be greater than approximately 50.0 feet, less than approximately 2.0 feet, or another suitable value between 2.0 feet and 50.0 feet; and/or the body height 12H can be greater than approximately 15.0 feet, less than approximately 0.6 feet, or another suitable value between 0.6 feet and 15.0 feet. Still alternatively, the ratio of body length 12L to body height 12H can be greater than or lesser than 10:3. For example, in certain non-exclusive alternative embodiments, the ratio of body length 12L to body height 12H can be approximately 2:1, 5:2, 3:1, 7:2, 4:1, 9:2, 5:1, 6:1, 7:1, 8:1, 9:1 or 10:1.

As shown in FIG. 1C, the body longitudinal axis 36 extends along the length of the vehicle body 12 (i.e. parallel to the body length 12L from the body front 24A to the body rear 26A), and the body transverse axis 38 is aligned orthogonally to the body longitudinal axis 36 and is positioned halfway between the body front 24A and the body rear 26A.

Additionally, FIG. 1C also illustrates that the vehicle body 12 can be defined as including the body length 12L and a body width 12W, which measures the distance between the port side 32 and the starboard side 34. As noted, the body length 12L is substantially parallel to the body longitudinal axis 36. Further, the body width 12W is substantially orthogonal to the body longitudinal axis 36 and substantially parallel to the body transverse axis 38.

In addition to the variability of the body length 12L, as noted above; it should be appreciated that the body width 12W can also be varied as desired. For example, in certain embodiments, the body length 12L, as noted above, can vary between approximately 2.0 feet and 50.0 feet, and the body width 12W can vary between approximately 1.4 feet and 35.0 feet. More particularly, (i) in a first embodiment, the vehicle body 12 can have a body length 12L of approximately 2.0 feet and a body width 12W of approximately 1.4 feet; (ii) in a second embodiment, the vehicle body 12 can have a body length 12L of approximately 5.0 feet and a body width 12W of approximately 3.5 feet; (iii) in a third embodiment, the vehicle body 12 can have a body length 12L of approximately 15.0 feet and a body width 12W of approximately 10.5 feet; and (iv) in a fourth embodiment, the vehicle body 12 can have a body length 12L of approximately 50.0 feet and a body width 12W of approximately 35.0 feet. In each of such embodiments, the ratio of body length 12L to body width 12W is approximately 10:7. Alternatively, the body length 12L can be greater than approximately 50.0 feet, less than approximately 2.0 feet, or another suitable value between 2.0 feet and 50.0 feet; and/or the body width 12W can be greater than approximately 35.0 feet, less than approximately 1.4 feet, or another suitable value between 0.6 feet and 15.0 feet. Still alternatively, the ratio of body length 12L to body width 12W can be greater or lesser than 10:7. For example, in certain non-exclusive alternative embodiments, the ratio of body length 12L to body width 12W can be approximately 1:4, 1:3, 1:2, 3:5, 4:5, 1:1, 5:4, 3:2, 2:1, 5:2 or 3:1.

It should be appreciated that a higher ratio of body length 12L to body width 12W can be utilized to decrease the overall drag on the vehicle body 12, which is more appropriate for higher speed operations. Conversely, a lower ratio of body length 12L to body width 12W can be utilized for a very slow speed, endurance environment. It should also be appreciated that the correlations described herein between the body length 12L and the body width 12W of the vehicle body 12 can be further correlated with the body height 12H (illustrated in FIG. 1B) as illustrated and describe herein above.

Additionally, it should further be appreciated that the larger sizes for the vehicle body 12 enable certain applications that may not be possible with the smaller sizes. For example, the larger sizes of the vehicle body 12 facilitate larger payloads and higher altitudes including near continuous operations in the national airspace. Operational uses of such larger embodiments include news traffic observation, sporting events overhead coverage, police surveillance, firefighting observation and support, disaster response with on station video or mobile communication nodes, direct broadcast high-bandwidth communications, and airborne cellular stations to fill gaps where ground stations are not practical. Moreover, potential military applications include all aspects of Command, Control, Communications, Intelligence, Surveillance, and Reconnaissance.

It should also be appreciated that each of the hulls 40A-40D have an individual hull width that can be combined to equal to the overall body width 12W. For example, in an embodiment including four hulls 40A-40D such as shown herein, and with each of the hulls 40A-40D being of substantially equal size (height, width and length), the hull width of each hull 40A-40D will be approximately, if not precisely, one-fourth of the overall body width 12W. Alternatively, it should be appreciated that if the hulls 40A-40D are of differing sizes, i.e. differing widths, then the individual hull widths can differ from one another in any desired manner.

Further, as shown in FIG. 1C, (i) the first hull 40A includes a first hull longitudinal axis 42A that is substantially parallel to the body longitudinal axis 36; (ii) the second hull 40B includes a second hull longitudinal axis 42B that is substantially parallel to the body longitudinal axis 36; (iii) the third hull 40C includes a third hull longitudinal axis 42C that is substantially parallel to the body longitudinal axis 36; and (iv) the fourth hull 40D includes a fourth hull longitudinal axis 42D that is substantially parallel to the body longitudinal axis 36.

Connections between the hulls 40A-40D can provide certain benefits for the air vehicle 10 that enables improved operational performance of the air vehicle 10. As illustrated in FIGS. 1A, 1C and 1D, and as noted above, the hulls 40A-40D are positioned adjacent to one another and are secured to one another in a side-by-side manner. Additionally, with reference to FIGS. 1A, 1C, and 1D, each hull 40A-40D includes a planar, first side wall 43A and an opposed, planar, second side wall 43B that are substantially parallel to one another. In particular, in some embodiments, the first side wall 43A and the second side wall 43B of each hull 40A-40D are substantially parallel to one another for substantially the entire body length 12L from the body front 24A to the body rear 26A. Additionally and/or alternatively, in other embodiments, the first side wall 43A and the second side wall 43B are substantially parallel to one another for at least a majority of the body length 12L from the body front 24A to the body rear 26A. Moreover, in certain non-exclusive alternative embodiments, the side walls 43A, 43B of any one hull 40A-40D are also substantially parallel to the side walls 43A, 43B of each of the other hulls 40A-40D for substantially the entire body length 12L from the body front 24A to the body rear 26A, and/or for at least a majority of the body length 12L from the body front 24A to the body rear 26A. For example, in one non-exclusive embodiment, advanced composite walls and composite seams can be utilized between adjacent hulls 40A-40D to reduce the need for mechanical support fixtures. Additionally, the walls between the separate air chambers, i.e. between the hulls 40A-40D, can act as a vertical attachment point for the payload assembly 20 and electronics, i.e. within the control assembly 22. Further, as discussed herein below, the outside walls (i.e. the outer skin) of the vehicle body 12 provide the surface to which the propulsion assembly 14 can be secured.

Another key element of the multi-hull, multi-chamber approach to the design of the vehicle body 12 is the control of span-wise (i.e. width-wise) airflow through vortex generation between the air envelopes, i.e. between the hulls 40A-40D. This essentially traps the air, thereby preventing it from spilling off the side of the vehicle body 12 and increases the overall vertical lift capabilities of the air vehicle 10.

The design of the propulsion assembly 14 can be varied to suit the specific requirements of the air vehicle 10. Referring to FIGS. 1A-1C, the propulsion assembly 14 includes a plurality of engines 44 that are secured to the vehicle body 12. The plurality of engines 44 generate thrust to provide various desired operational benefits for the air vehicle 10, e.g., for purposes of moving and controlling the movement of the vehicle body 12 during takeoff, in-flight operations and recovery. Further, the plurality of engines 44 can also be utilized to exercise pitch, roll and yaw control for the air vehicle 10. Moreover, the problem of the change in weight due to fuel burn during operations and the potential difficulty this presents during loading and unloading can also be addressed through the choice of propulsion assembly 14 and power assembly 18. For example, as noted herein below, the power assembly 18 can include one or more batteries, where the weight of the batteries does not change during flight operations. The manner of securing the engines 44 to the vehicle body 12 will be described in greater detail herein below.

In certain embodiments, at least two of the plurality of engines 44 of the propulsion assembly 14 can have separately and independently controlled thrust vectors that enable the engines 44 to work in conjunction with one another to provide various desired operational benefits for the air vehicle 10. More specifically, in one embodiment, each of the plurality of engines 44 of the propulsion assembly 14 can have separately and independently controlled thrust vectors. For example, in the embodiment illustrated in the Figures, the propulsion assembly 14 includes four engines 44, i.e. a port front engine 44A, a port rear engine 44B, a starboard front engine 44C and a starboard rear engine 44D. Alternatively, the propulsion assembly 14 can be designed to include greater than four or fewer than four engines.

The positioning of the engines 44A-44D can be varied to provide the desired performance characteristics for the air vehicle 10. In certain embodiments, it is desired that the front engines 44A, 44C be positioned so as to have unobstructed access to clean air, and the rear engines 44B, 44D can be positioned before the vehicle body 12 begins more rapid aero tapering toward the body rear 26A. For example, in the embodiment illustrated in the Figures, (i) the port front engine 44A is secured to the port side 32 of the vehicle body 12 between the body front 24A and the body transverse axis 38; (ii) the port rear engine 44B is secured to the port side 32 of the vehicle body 12 between the body transverse axis 38 and the body rear 26A; (iii) the starboard front engine 44C is secured to the starboard side 34 of the vehicle body 12 between the body front 24A and the body transverse axis 38; and (iv) the starboard rear engine 44D is secured to the starboard side 34 of the vehicle body 12 between the body transverse axis 38 and the body rear 26A. Additionally, in certain embodiments, (i) the port front engine 44A can be positioned closer to the body front 24A than to the body transverse axis 38 (i.e. along the front-most twenty-five percent (25%) of the body length 12L); (ii) the port rear engine 44B can be positioned closer to the body rear 26A than to the body transverse axis 38 (i.e. along the rear-most twenty-five percent (25%) of the body length 12L); (iii) the starboard front engine 44C can be positioned closer to the body front 24A than to the body transverse axis 38 (i.e. along the front-most twenty-five percent (25%) of the body length 12L); and (iv) the starboard rear engine 44D can be positioned closer to the body rear 26A than to the body transverse axis 38 (i.e. along the rear-most twenty-five percent (25%) of the body length 12L). Alternatively, the engines 44A-44D can be positioned in a different manner along the length of the vehicle body 12. For example, the port front engine 44A and/or the starboard front engine 44C can be positioned along the front-most five percent, ten percent, fifteen percent, twenty percent, thirty percent, thirty-five percent, or forty percent of the body length 12L of the vehicle body 12; and/or the port rear engine 44B and the starboard rear engine 44D can be positioned along the rear-most five percent, ten percent, fifteen percent, twenty percent, thirty percent, thirty-five percent, or forty percent of the body length 12L of the vehicle body 12. Still alternatively, the engines 44 can be positioned approximately at the four corners of the vehicle body 12.

Additionally, in certain embodiments, the port front engine 44A and the starboard front engine 44C are positioned at approximately the same position, albeit on opposite sides, along the body length 12L of the vehicle body 12. Alternatively, the port front engine 44A and the starboard front engine 44C can be positioned at different positions along the body length 12L of the vehicle body 12. Similarly, in certain embodiments, the port rear engine 44B and the starboard rear engine 44D are positioned at approximately the same position, albeit on opposite sides, along the body length 12L of the vehicle body 12. Alternatively, the port rear engine 44B and the starboard rear engine 44D can be positioned at different positions along the body length 12L of the vehicle body 12.

Additionally, as illustrated in FIG. 1B, in some embodiments, the port front engine 44A and the port rear engine 44B are aligned relative to one another in a manner that is substantially parallel to the body longitudinal axis 36. Stated in another manner, in such embodiments, the port front engine 44A and the port rear engine 44B have approximately the same vertical positioning along the body height 12H of the vehicle body 12. For example, in one such embodiment, the port front engine 44A and the port rear engine 44B can each be positioned at approximately the midpoint along the body height 12H of the vehicle body 12. Alternatively, the port front engine 44A and the port rear engine 44B can be aligned relative to one another in a manner that is not substantially parallel to the body longitudinal axis 36. For example, the port front engine 44A can be higher or lower than the port rear engine 44B along the body height 12H of the vehicle body 12.

Similarly, in some embodiments, the starboard front engine 44C and the starboard rear engine 44D are aligned relative to one another in a manner that is substantially parallel to the body longitudinal axis 36. Stated in another manner, in such embodiments, the starboard front engine 44C and the starboard rear engine 44D have approximately the same vertical positioning along the body height 12H of the vehicle body 12. For example, in one such embodiment, the starboard front engine 44C and the starboard rear engine 44D can each be positioned at approximately the midpoint along the body height 12H of the vehicle body 12. Alternatively, the starboard front engine 44C and the starboard rear engine 44D can be aligned relative to one another in a manner that is not substantially parallel to the body longitudinal axis 36. For example, the starboard front engine 44C can be higher or lower than the starboard rear engine 44D along the body height 12H of the vehicle body 12.

Further, in one embodiment, each of the engines 44A-44D can have approximately the same vertical positioning along the body height 12H of the vehicle body 12. In particular, as shown in FIG. 1D, the port front engine 44A and the starboard front engine 44C have approximately the same vertical positioning along the body height 12H of the vehicle body 12. Moreover, since the port rear engine 44B and the starboard rear engine 44D are not visible in FIG. 1D, that can be seen as an indication that the rear engines 44B, 44D have approximately the same vertical positioning as the corresponding front engines 44A, 44C.

Having the front engines 44A, 44C positioned toward the body front 24A and the rear engines 44B, 44D positioned toward the body rear 26A of the vehicle body 12, as disclosed herein, in conjunction with the wing airfoil shape of the vehicle body 12, enables a fuller, more stable lifting capability, as both the front and rear of the vehicle body 12 are actively supported. Additionally, in certain embodiments, the weight of the engines 44A-44D is balanced and offset with the partial lifting capacity. Moreover, such positioning of the engines 44A-44D also provides enhanced maneuverability and direct control of each corner of the vehicle body 12.

Primary pitch and roll control is exercised through the articulating engines 44A-44D working independently and/or together to achieve the correct pitch and roll for the phase of flight or maneuver. For example, in initial climb-out, the front engines 44A, 44C can first establish the correct attitude of the air vehicle 10 while the rear engines 44B, 44B provide the desired forward thrust. Alternatively, both front engines 44A, 44C and rear engines 44B, 44D can work together to adjust the vehicle pitch attitude and provide desired forward thrust. Additionally, the articulating engines 44A-44D coupled with the partial buoyancy of the vehicle body 12 allow for a vertical takeoff and/or landing, and transition to aerodynamic generating lift through the full body airfoil design in situations where a suitable surface is not available for a conventional takeoff.

The stabilizer assembly 16 is provided to assist in maintaining and/or improving directional stability of the air vehicle 10. More specifically, the control of the air vehicle 10 is maintained through the use of the stabilizer assembly 16 in conjunction with the engines 44A-44D of the propulsion assembly 14.

The design of the stabilizer assembly 16 can be varied to suit the specific requirements of the air vehicle 10. As illustrated in the Figures, the stabilizer assembly 16 can include at least one stabilizer 46V that is secured to the vehicle body 12 and that cantilevers away from the vehicle body 12. For example, in this embodiment, the stabilizer assembly 16 includes two substantially vertically-oriented stabilizers 46V that are secured to the vehicle body 12 and that cantilever away from the vehicle body 12. Additionally, as shown, the stabilizers 46V can be positioned substantially near the body rear 26A and along the upper surface 28 of the vehicle body 12. In particular, as shown, one stabilizer 46V can be positioned at an area of connection between the first hull 40A and the second hull 40B, and the other stabilizer 46V can be positioned at an area of connection between the third hull 40C and the fourth hull 40D. Further, in alternative embodiments, the stabilizers 46V can be formed from a rigid structure or a non-rigid (e.g., air filled) structure. Alternatively, the stabilizer assembly 16 can include more than two stabilizers 46V or only one stabilizer 46V, and/or the stabilizers can be designed and/or positioned in a different manner than is illustrated in the Figures.

Additionally, in one embodiment, the stabilizer assembly 16 can further include one or more small horizontal stabilizers 46H positioned behind the engines 44A-44D to further assist in maintaining and/or improving directional stability of the air vehicle 10.

It should be appreciated that the use and positioning of the articulating engines 44A-44D as described, enables the use of smaller stabilizers 46, as the engines 44A-44D utilize thrust vectoring to actively control each corner of the vehicle body 12 in a coordinated manner. Additionally, it should further be appreciated that this coordinated approach to using the engines 44A-44D reduces the twisting (i.e. torsional loads) that could otherwise be placed on the vehicle body 12, which may cause undesired issues with the individual hulls 40A-40D.

The power assembly 18 provides power to the propulsion assembly 14 and at least a portion of the control assembly. Additionally, in certain embodiments, the power assembly 18 can be secured to the vehicle body 12. For example, in one embodiment, the power assembly 18 includes one or more batteries (not shown) that are secured to the vehicle body 12. In that respect, the power assembly 18 can also be referred to as a "battery assembly".

Additionally, in some embodiments, as shown, the power assembly 18 can further comprise a solar-collector 48 that is coupled to the vehicle body 12. The solar-collector 48 can be utilized to recharge the battery assembly 18 during operation of the air vehicle 10, which will enable improved, extended endurance for the air vehicle 10. For example, in one embodiment, the solar-collector 48 can comprise a thin-film solar electric generation material that is coated on and/or attached to the upper surface 28 of the vehicle body 12, e.g., via rigid or semi-rigid materials. Additionally and/or alternatively, the solar-collector 48 may incorporate a lightweight, rigid section that is formed on and/or integrated into the upper surface 28 of the vehicle body 12. Further, in alternative embodiments, the solar-collector 48 can form substantially the entire upper surface 28 of the vehicle body 12 or only a portion of the upper surface 28 of the vehicle body 12 depending on the desired generation capability.

The design of the payload assembly 20 can be varied to suit the specific requirements of the air vehicle 10 and/or the control assembly 22. As shown in FIGS. 1B and 1D, the payload assembly 20 includes a payload housing 50 that is secured to the lower surface 30 of the vehicle body 12. In one embodiment, as shown in FIG. 1B, the payload housing 50 is positioned toward the body front 24A of the vehicle body 12, i.e. is positioned ahead of the body transverse axis 38; and, as shown in FIG. 1D, the payload housing 50 is secured to the lower surface 30 of the second hull 40B and the third hull 40C, i.e. the middle-most hulls, of the vehicle body 12. Stated in another manner, the payload housing 50 is secured to the lower surface 30 of the vehicle body 12 in the forward center of the vehicle body 12. In alternative embodiments, the payload housing 50 can be attached to the lower surface 30 of the vehicle body 12 or slightly embedded into the lower surface 30 of the vehicle body 12, with access provided from the bottom using quick removal and replace fasteners.

Additionally, the payload housing 50 can be a semi-rigid structure that is designed to retain and/or support various components of the control assembly 22. Moreover, in larger embodiments of the vehicle body 12, the payload housing 50 can provide the necessary housing for pilots, passengers, equipment, etc. that may be flying with the air vehicle 10.

In the embodiment illustrated in the Figures, the payload assembly 20 further includes a sensor assembly 52 that is coupled to the payload housing 50. In certain embodiments, the sensor assembly 52 can include one or more sensors 52A (one is illustrated in phantom) that are adapted to sense various parameters related to the movement and positioning of the air vehicle 10. For example, in some embodiments, the sensors 52A can include accelerometers (two-axis and/or three-axis accelerometers), gyros, a GPS, radar altimeters, a compass (e.g., magnetic), an airspeed sensor, and a static pressure sensor in the control path. Alternatively, the sensor assembly 52 can include more sensors or fewer sensors than those specifically listed herein.

Additionally, the sensors 52A may be augmented with fixed devices that are positioned on the outer skin of the vehicle body 12. Further, one or more of the sensors 52A can be air-cooled or can use electronic fans to augment the air cooling. With particular sensors 52A or in alternate configurations, enhanced avionics environmental controls may be used. Moreover, the sensor assembly 52 may comprise one or more of electro-optic, infrared, radio-frequency, or multispectral sensors. Additionally, quick changing of the sensors 52A of the sensor assembly 52 allows for rapid reconfiguration to suit particular mission requirements.

In one embodiment, the air vehicle 10 may be fitted with navigation lighting for night and national airspace operations. Further, special handling and support equipment can also be included with the air vehicle 10 to safeguard the air vehicle 10 in transit, during flight preparation and recovery, and during ground operations.

Additionally, in one embodiment, an image capturing device 53, e.g., a camera, can be coupled to a housing bottom 54 of the payload housing 50 within a movable support assembly 56. For example, the camera 53 can be housed within a lightweight, rotatable turret assembly that is mounted on the housing bottom 54 of the payload housing 50. With this design, the camera 53 can be pointed in any desired direction to provide a clear unobstructed 360 degree view of below the air vehicle 10 up to the horizon.

The control assembly 22 enables the proper and desired control of the air vehicle 10. Additionally, the design of the control assembly 22 can be varied to suit the specific requirements of the air vehicle 10. For example, in one embodiment, the control assembly 22 includes a vehicle control system 58 (illustrated in phantom) and a remote control system 60. Alternatively, the control assembly 22 can be designed without the remote control system 60.

In one embodiment, the vehicle control system 58 is secured to the vehicle body 12. Further, the vehicle control system 58 is electrically connected to the propulsion assembly 14 to control the operation of each of the engines 44A-44D. The vehicle control system 58 can include one or more processors and circuits. Additionally, the vehicle control system 58 can also include a transmitter (not shown) for transmitting data, instructions or information (images, sensed data, etc.) to the remote control system 60, and a receiver (not shown) for receiving such data, instructions or information from the remote control system 60.

Additionally, the remote control system 60 is adapted to send signals to the vehicle control system 58 in order to effectively control the operation of the propulsion assembly 14. In certain applications, the remote control system 60 is adapted to be controlled by a user who is positioned remotely from the air vehicle 10. The remote control system 60 can include one or more processors and circuits. Additionally, the remote control system 60 can include a transmitter (not shown) for transmitting data, instructions or information (images, sensed data, etc.) to the vehicle control system 58, and a receiver (not shown) for receiving such data, instructions or information from the vehicle control system 58. With this design, data, instructions and/or information can be freely transferred between the vehicle control system 58 and the remote control system 60. Thus, the remote user is able to effectively, efficiently and precisely control the operation of the air vehicle 10.

Certain features and aspects of the control assembly 22, and the operation thereof, will be discussed in further detail herein below.

As noted above, FIG. 1E is a cutaway view of the extended endurance air vehicle 10 illustrated in FIG. 1A. More particularly, FIG. 1E illustrates certain additional features of the air vehicle 10 and/or the vehicle body 12. For example, FIG. 1E illustrates that each hull 40A-40D defines a separate, sealed fluid chamber 41A, 41B, 41C, 41D. Additionally, each hull 40A-40D can include one or more secondary air bladders 12B that can be positioned inside the respective hull 40A-40D and substantially adjacent to the vehicle body 12. Additionally, as noted above, the secondary air bladder 12B can be utilized for purposes of enabling the vehicle body 12 to effectively maintain its shape during movement between altitudes.

During use of the air vehicle 10, the air vehicle 10 is subjected to differing ambient pressures, e.g., during movement between lower altitudes (with higher ambient pressure) and higher altitudes (with lower ambient pressure). To accommodate for such pressure changes, the secondary air bladder 12B may be selectively moved along a continuum between an expanded position (not shown) and a collapsed position (as shown in FIG. 1E). As shown in FIG. 1E, the secondary air bladder 12B is illustrated in the collapsed position substantially adjacent to an inner surface near the body top 28A and the body bottom 30A of the vehicle body 12. In one embodiment, the secondary air bladder 12B can be selectively filled or emptied by an electronic motor fan assembly (not illustrated) or another filler assembly to enable the secondary air bladder 12B to move between the expanded position and the collapsed position. Alternatively, the secondary air bladder 12B can be powered in another suitable manner.

Generally speaking, as is known, as altitude increases, the ambient pressure decreases. If only low altitude flying is desired, the fluid chambers 41A-41D can be fully filled and the secondary air bladders 12B can be left empty. For only low altitude flying, it may not be necessary to compensate for the relatively small changes in pressure.

Alternatively, if high altitude flying is desired, the fluid chambers 41A-41D can be partly filled (less than fully filled). Prior to takeoff, the secondary air bladders 12B can be filled with the electronic motor fan assembly so that the hulls 40A-40D are maintained rigid. Subsequently, as the air vehicle 10 moves upward, the ambient pressure drops. During this time, the sealed fluid chambers 41A-41D will expand as a result of the decrease in ambient pressure. During this time, fluid can be released from the secondary air bladders 12B to accommodate the expansion of the sealed fluid chambers 41A-41D. Subsequently, during descent, fluid can be moved in the secondary air bladders 12B to accommodate the contraction of the sealed fluid chambers 41A-41D.

Additionally, one or more of the fluid chambers 41A-41D can include a pressure relieve valve that releases the pressure in the respective fluid chamber 41A-41D to inhibit overexpansion of the respective hull 40A-40D.

Figure 2:
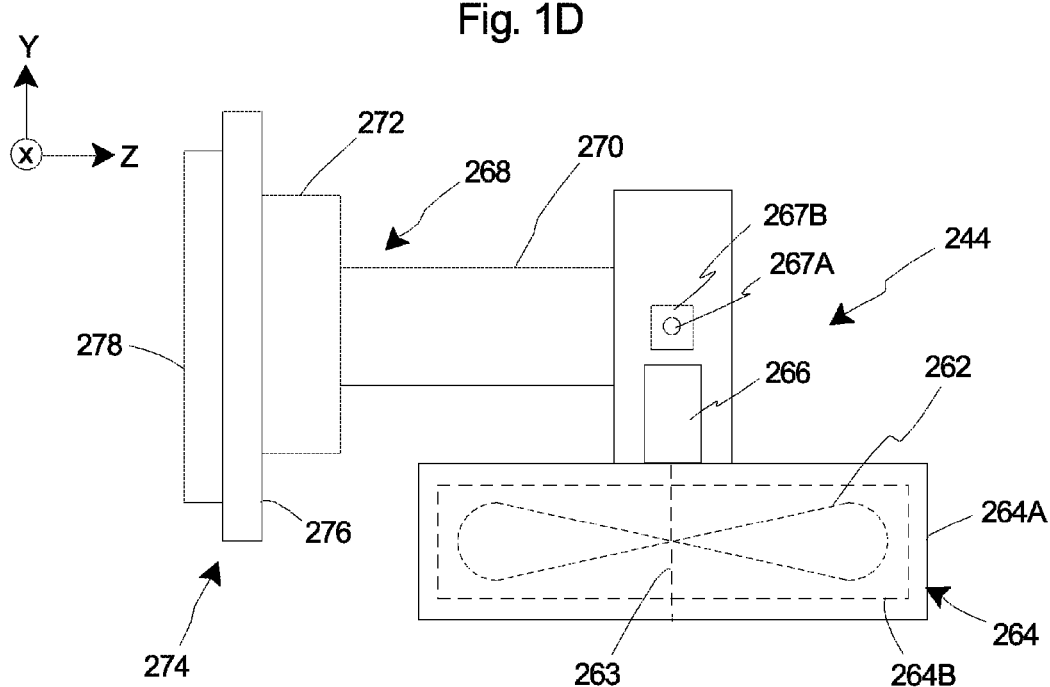
FIG. 2 is a simplified schematic illustration of an engine that can be used with the extended endurance air vehicle illustrated in FIG. 1A.

FIG. 2 is a simplified schematic illustration of an engine 244 that can be secured to the vehicle body 12 (illustrated in FIG. 1A) and used as part of the air vehicle 10 (illustrated in FIG. 1A). More particularly, the engine 244 can be used as any of the port front engine 44A, the port rear engine 44B, the starboard front engine 44C and/or the starboard rear engine 44D as illustrated as described above.

As described herein, the engine 244 is movable in two degrees of freedom, i.e. pitch (about the Z axis) and yaw (about the X axis), which allows for direct control of vehicle yaw in a coordinated manner. The design of the engine 244 and the means of attaching the engine 244 to the air vehicle 10, i.e. to the vehicle body 12, can be varied. As shown in this embodiment, the engine 244 includes (i) a fan blade assembly 262 (illustrated in phantom, also referred to herein simply as a "blade assembly"), (ii) a blade housing 264, (iii) a fan motor 266, (iv) a fan positioner 268 including a motor actuation arm 270, a pitch actuator 272, e.g., an electronic actuator, a yaw pivot 267A, and a yaw actuator 267B, e.g. an electronic actuator, and (v) an attachment assembly 274 for attaching the engine 244 to the vehicle body 12. Alternatively, the engine 244 can have a different design, with more or fewer components than those listed above. For example, in one non-exclusive alternative embodiment, the engine 244 can be designed without the blade housing 264.

The blade assembly 262 rotates to generate thrust that can be utilized to move the air vehicle 10. In certain non-exclusive alternative embodiments, the blade assembly 262 can comprise a 2-blade propeller, a multi-blade propeller, or a ducted fan. Alternatively, the blade assembly 262 can have another suitable design.

The blade housing 264 provides a protective housing for the blade assembly 262 while allowing for air to pass therethrough (e.g. through a screen). More particularly, the blade housing 264 is adapted to substantially encircle a perimeter of the blade assembly 262 to inhibit the blade assembly 262 from harming an operator of the air vehicle. Stated in another manner, with this design, the blade assembly 262 can be positioned substantially within the blade housing 264. Additionally, the blade housing 264 can function as a safety measure that inhibits fingers, etc. from getting caught in the blade assembly 262.

In one embodiment, the blade housing 264 includes an outer housing member 264A and an inner housing member 264B (illustrated in phantom) that is positioned substantially within the outer housing member 264A. The blade assembly 262 can be adapted to move in certain, e.g., two, degrees of freedom with the inner housing member 264B. During use of the engine 244, the inner housing 264B can be selectively moved relative to the outer housing member 264A to selectively adjust an angle of thrust that is generated by the engine 244.

The fan motor 266 provides a force that rotates the blade assembly 262 in order to generate thrust. For example, as illustrated in FIG. 2, the fan motor 266 can provide a force to rotate the blade assembly 262 about a blade axis 263. In one embodiment, the fan motor 266 can be mounted external to the vehicle body 12 at the end of the motor actuation arm 270 of the fan positioner 268. The fan motor 266 can have any suitable design that can effectively provide the desired force to rotate the blade assembly 262. For example, the fan motor 266 can be an electrical motor.

The fan positioner 268 selectively moves, i.e. adjusts the position and/or orientation of, the blade assembly 262 and the fan motor 266 relative to the vehicle body 12. More specifically, the fan positioner 268 selectively moves the blade assembly 262 (i.e. within the inner housing member 264B) and the fan motor 266, e.g., about the X axis and/or about the Z axis as shown in FIG. 2, relative to the vehicle body 12 to selectively adjust an angle of thrust that is generated by the engine 244. For example, the fan positioner 268 can selectively move the inner housing 264B, and thus the blade assembly 262 to selectively control pitch and yaw of the engine 244.

As noted above, in this embodiment, the fan positioner 268 includes the motor actuation arm 270 and the pitch actuator 272. During use, the pitch actuator 272 controls the pitch positioning of the fan motor 266, with the positioning being controlled through selective movement of the motor actuation arm 270 via the pitch actuator 272. Thus, the pitch actuator 272 is able to control the position of the blade assembly 262, about the Z axis, and selectively adjust the angle of thrust about the Z axis that is generated by the engine 244. Moreover, the specific operation of the fan positioner 268, the fan motor 266 and the blade assembly 262 can be controlled via feedback communication with the control assembly 22 (illustrated in FIG. 1A).

Further, in this embodiment, the fan positioner 268 includes a yaw pivot 267A, and a yaw actuator 267B. During use, the yaw actuator 267B controls the yaw positioning of the fan motor 266, with the positioning being controlled through selective movement about the yaw pivot 267A via the yaw actuator 267B. Thus, the yaw actuator 267B is able to control the position of the blade assembly 262, about the X axis, and selectively adjust the angle of thrust about the X axis that is generated by the engine 244. Moreover, the specific operation of the yaw actuator 267B can be controlled via feedback communication with the control assembly 22 (illustrated in FIG. 1A).

Additionally, as noted above, the attachment assembly 274 is provided for attaching the engine 244 to the vehicle body 12, i.e. for mounting the engine 244 to the outer skin of the vehicle body 12. As shown, the attachment assembly 274 can include a mounting frame 276 and a support bracket 278 that cooperate to attach the engine 244 to the vehicle body 12. In this embodiment, the fan positioner 268, i.e. the actuator 272, is coupled to the mounting frame 276, and the mounting frame is coupled to the support bracket 278 that directly attaches to the vehicle body 12. Moreover, the support bracket 278 provides additional support near the attachment locations where the engines 244 are secured to the vehicle body 12.

It should be noted that the independent pitch and yaw control of the angle of thrust for each motor can be adjusted and controlled in another fashion than illustrated in FIG. 2.

Figure 3:
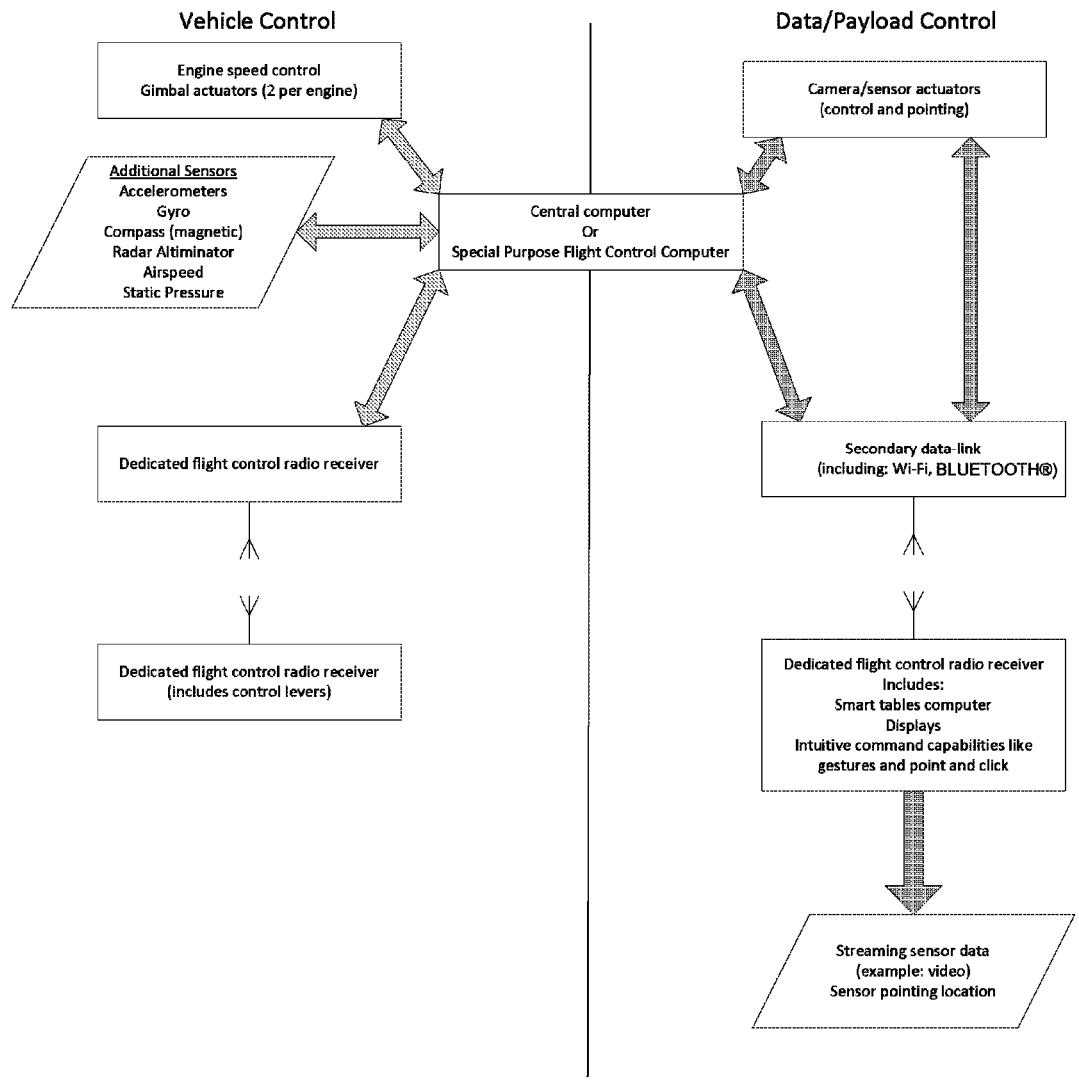
FIG. 3 is a simplified network diagram of vehicle control and data networks usable with the extended endurance air vehicle illustrated in FIG. 1A.

FIG. 3 is a simplified network diagram of vehicle control and data networks usable with the air vehicle illustrated in FIG. 1A. Additionally, key control devices are identified that can be used with various embodiments of the air vehicle. Further, integration of payload output and/or output generated from the sensor assembly is also illustrated.

As illustrated in FIG. 3, in certain non-exclusive embodiments, the extended endurance air vehicle can employ two interrelated and/or interconnected data paths for command and control of the air vehicle. For example, the payload control can be conducted using one data transfer protocol and the vehicle control can be conducted using a second protocol that can be interrelated and/or interconnected via a central computer or special purpose flight control computer.

The initial development and operational use of the air vehicle enables RC aircraft type radio control equipment to be employed for development and backup vehicle control. In alternate configurations, a second command and control path can be maintained through specific data link, cellular, or satellite network. The primary data path for early operations may include wireless telecommunication and/or computer communication equipment and services such as a Wi-Fi device and/or BLUETOOTH® connection. Additionally, the data path will carry internet-protocol based vehicle and payload command and sensor downlink data.

Anticipated output can include such features as full motion video and sensor pointing location, although additional output can also be appreciated through use of the vehicle control and data networks identified herein with the air vehicle. The link may also provide for continuous monitoring of critical information and vehicle health. Additionally, the link can provide in-flight diagnostics to enhance vehicle safety.

Further, in certain embodiments, GPS may also be included in the ground control equipment, i.e. the remote control system, and the differential GPS correction sent through the command or data link to the air vehicle to improve the positional accuracy.

Figure 4A:
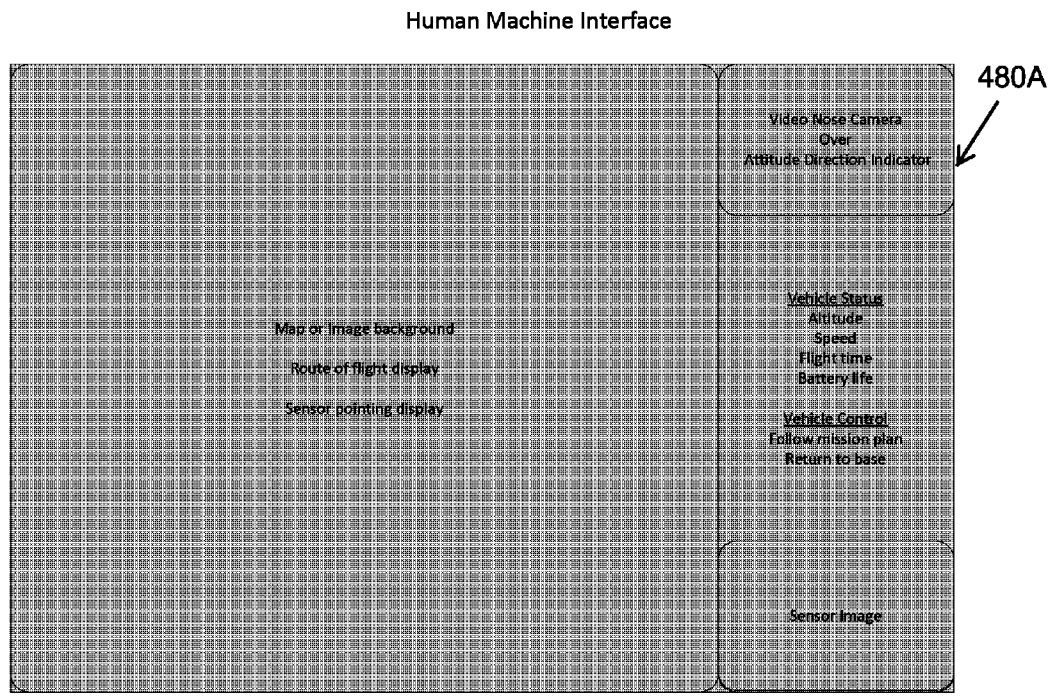
FIGS. 4A and 4B are simplified illustrations of a video display of a system interface showing data and vehicle control of the extended endurance air vehicle.
Figure 4B:
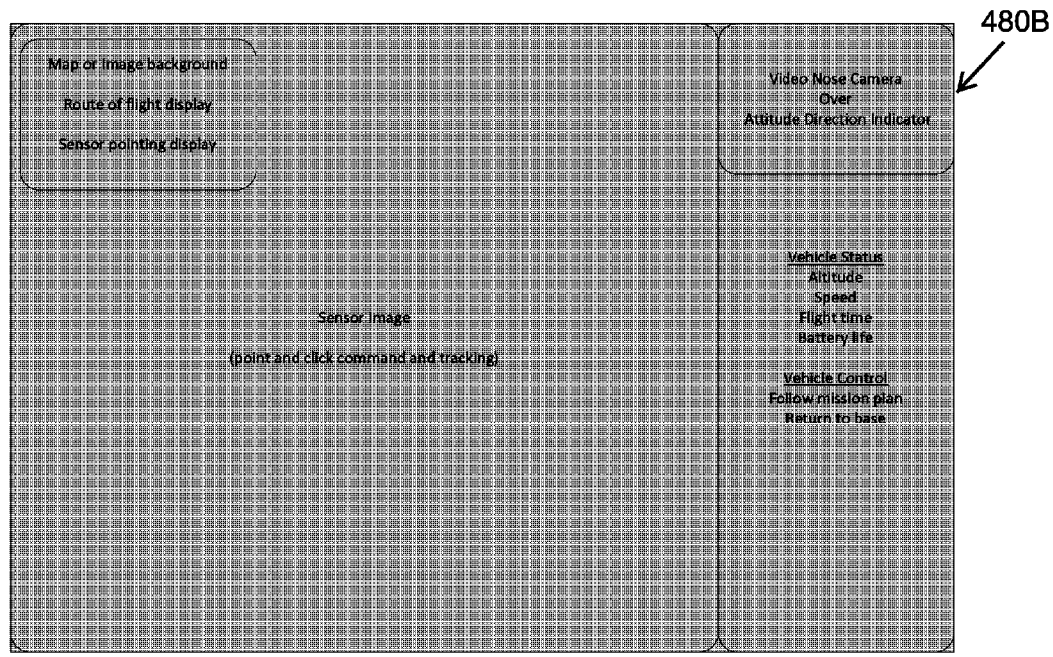

FIGS. 4A and 4B are simplified illustrations of a video display of a system interface showing data and vehicle control of the air vehicle. More particularly, FIG. 4A illustrates the system interface 480A including a command screen overlaid on geospatial mapping data and vehicle/payload health information; and FIG. 4B illustrates the system interface 480B including a payload/sensor focused screen with minimized command information.

As shown in FIG. 4A, with the geospatial focus of the system interface 480A, the video display primarily indicates such features as a map or image background, a route of flight display, and/or a sensor pointing display. Secondarily to the geospatial focus in this view of the system interface 480A are included such features as (i) a video nose camera over attitude direction indicator; (ii) vehicle status information, e.g., altitude, speed, flight time, battery life, etc.; (iii) vehicle control information, e.g., indicators to follow mission plan and/or return to base; and (iv) sensor image. Additionally and/or alternatively, the system interface 480A can include further information or data than is disclosed herein.

Additionally, as shown in FIG. 4B, with the payload/sensor focus of the system interface 480B, the video display primarily indicates imagery generated from the one or more sensors that are provided with the air vehicle. Secondarily to the sensor image focus in this view of the system interface 480B are included such features as (i) a video nose camera over attitude direction indicator; (ii) vehicle status information, e.g., altitude, speed, flight time, battery life, etc.; (iii) vehicle control information, e.g., indicators to follow mission plan and/or return to base; and (iv) geospatial image data and information such as a map or image background, a route of flight display, and/or a sensor pointing display. Additionally and/or alternatively, the system interface 480B can include further information or data than is disclosed herein.

In one embodiment, the desired control method can be provided through a touch screen tablet type device, i.e. system interface, that allows the setting of takeoff, navigation, holding, and recovery modes and locations. The selected locations can be superimposed on a geospatial image or map (such as is shown in FIG. 4A). Additionally, as noted, status and health information for the air vehicle can also be displayed.

Figure 5:
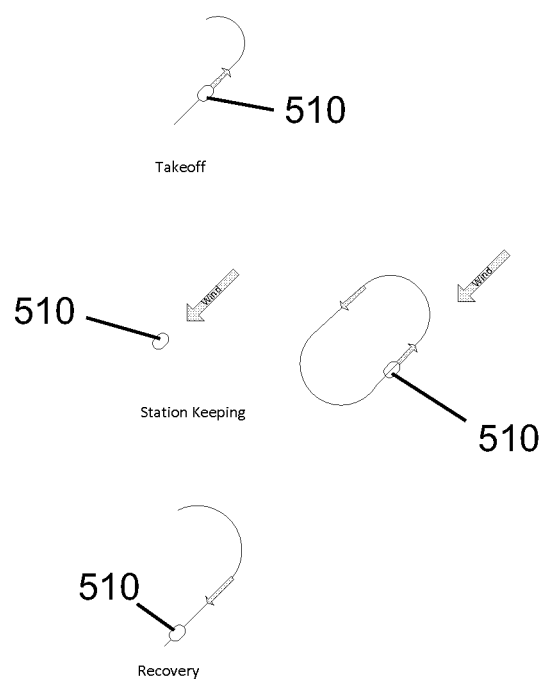
FIG. 5 illustrates the general operations of the extended endurance air vehicle, including take-off, in-flight station keeping, in-flight holding, and recovery.

FIG. 5 illustrates a non-exclusive example of the general operations of the extended endurance air vehicle 510, including take-off, in-flight station keeping, in-flight holding, and recovery. More particularly, FIG. 5 illustrates a non-exclusive example of the general flight pattern of the air vehicle 510 through such general operations.

Initially, once the operator (or user) powers on the air vehicle 510, the operator either places the air vehicle 510 on a smooth surface or holds the air vehicle in an appropriate direction for launch. At takeoff command, the air vehicle 510 climbs straight ahead until it reaches approximately twenty-five feet in altitude, as measured using a radar/laser altimeter or other means to accurately identify the altitude.

The air vehicle 510 then transitions to the commanded latitude/longitude control using the initiative map interface. It should be appreciated that with the unique design of the air vehicle 510, as described in detail herein above, the slow speed capability of the air vehicle 510 enables station keeping with only a moderate breeze. In this mode, the air vehicle 510 will use the relative movement of the air mass to maintain the desired precise geographic location. In a situation where the air mass is still, holding can be initiated through a series of coordinated turns in a relatively confined area. Additionally, it should be appreciated that the payload pointing, i.e. the pointing of the camera 53 (illustrated in FIG. 1B) and/or sensors 52A (illustrated in FIG. 1B) of the sensor assembly (illustrated in FIG. 1B), can be maintained through the use of the movable support assembly 56 (illustrated in FIG. 1B), e.g., the turret assembly, throughout the maneuver.

Finally, recovery is commanded by the operator using either a directed recovery reverse course to landing or to a recovery point picked by the operator. The operator secures the vehicle 510 in flight or once on the ground. Alternatively, the air vehicle 510 can be effectively controlled during flight operations via direct control of the motors and actuators through a remote control style control console.

It is understood that although a number of different embodiments of the air vehicle 10 have been illustrated and described herein, one or more features of any one embodiment can be combined with one or more features of one or more of the other embodiments, provided that such combination satisfies the intent of the present invention.

While a number of exemplary aspects and embodiments of the air vehicle 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An air vehicle comprising:
   a vehicle body having the shape of a wing airfoil so that the vehicle body generates lift when air flows over the vehicle body, the vehicle body having an outer skin including a substantially planar port side, a substantially planar starboard side, a body front, a body rear, a body longitudinal axis, and a body transverse axis positioned halfway between the body front and the body rear, the substantially planar port side and the substantially planar starboard side being formed from composite material, the vehicle body including a first hull having a first hull longitudinal axis, and a second hull having a second hull longitudinal axis, the hulls being positioned adjacent to one another and secured to one another in a side-by-side manner with the first hull longitudinal axis and the second hull longitudinal axis being substantially parallel to the body longitudinal axis, and each hull including a substantially planar first side wall and an opposed, substantially planar second side wall that are substantially parallel to one another, the side walls of each hull being substantially parallel to the side walls of each of the other hulls, and wherein the first side wall or the second side wall of each of the hulls is formed from composite material, and wherein the vehicle body is filled with a lighter-than-air gas; and
   a propulsion assembly that is secured to the vehicle body, the propulsion assembly generating thrust and including a port front engine that is secured to the substantially planar port side of the vehicle body between the body front and the body transverse axis, a port rear engine that is secured to the substantially planar port side of the vehicle body between the body transverse axis and the body rear, a starboard front engine that is secured to the substantially planar starboard side of the vehicle body between the body front and the body transverse axis, and a starboard rear engine that is secured to the substantially planar starboard side of the vehicle body between the body transverse axis and the body rear, wherein each engine is movable in two degrees of freedom, each engine including a fan blade assembly, a fan motor that provides a force to rotate the fan blade assembly to generate thrust, and a fan positioner that selectively moves the fan blade assembly and the fan motor relative to the vehicle body, the fan positioner including a pitch actuator that adjusts an angle of thrust about a first axis and a yaw actuator that adjusts the angle of thrust about a second axis that is different from the first axis.

2. The air vehicle of claim 1 wherein the port front engine and the port rear engine are aligned relative to one another in a manner that is substantially parallel to the body longitudinal axis, and wherein the starboard front engine and the starboard rear engine are aligned relative to one another in a manner that is substantially parallel to the body longitudinal axis.

3. The air vehicle of claim 1 wherein each engine further includes a blade housing, the fan blade assembly being positioned substantially within the blade housing.

4. The air vehicle of claim 1 further comprising a vehicle control system that is electrically connected to the propulsion assembly and that is secured to the vehicle body, and a remote control system that sends signals to the vehicle control system to control the propulsion assembly, wherein the remote control system is adapted to be controlled by a user who is positioned remotely from the air vehicle.

5. The air vehicle of claim 1 further comprising a battery assembly that provides power to the propulsion assembly, the battery assembly being secured to the vehicle body.

6. The air vehicle of claim 5 further comprising a solar-collector that is formed on an upper surface of the vehicle body, the solar-collector being usable to recharge the battery assembly.

7. The air vehicle of claim 1 wherein the vehicle body has a rounded leading edge, a sharp trailing edge, and an upper surface and a lower surface each having asymmetric curvature so that the vehicle body generates lift when air flows over the vehicle body.

8. An air vehicle that is remotely controlled by a user, the air vehicle comprising:
   a vehicle body having the shape of a wing airfoil with a rounded leading edge, a sharp trailing edge, and an upper surface and a lower surface each having asymmetric curvature so that the vehicle body generates lift when air flows over the vehicle body, the vehicle body having an outer skin including a substantially planar port side, a substantially planar starboard side, a body front, a body rear, a body longitudinal axis, and a body transverse axis positioned halfway between the body front and the body rear, the substantially planar port side and the substantially planar starboard side being formed from composite material, the vehicle body including a first hull having a first hull longitudinal axis, a second hull having a second hull longitudinal axis, and a third hull having a third hull longitudinal axis, the hulls being positioned adjacent to one another and secured to one another in a side-by-side manner with the first hull longitudinal axis, the second hull longitudinal axis and the third hull longitudinal axis being substantially parallel to the body longitudinal axis; wherein each hull defines a separate fluid chamber that is filled with a lighter-than-air gas; wherein each hull includes a substantially planar first side wall and an opposed, substantially planar second side wall that are substantially parallel to one another for at least a majority of the body length from the body front to the body rear, the side walls of each hull being substantially parallel to the side walls of each of the other hulls for at least a majority of the body length from the body front to the body rear; and wherein the first side wall or the second side wall of each of the hulls is formed from composite material;

a propulsion assembly that is secured to the vehicle body, the propulsion assembly generating thrust and including a port front engine that is secured to the substantially planar port side of the vehicle body between the body front and the body transverse axis and closer to the body front than to the body transverse axis, a port rear engine that is secured to the substantially planar port side of the vehicle body between the body transverse axis and the body rear and closer to the body rear than to the body transverse axis, a starboard front engine that is secured to the substantially planar starboard side of the vehicle body between the body front and the body transverse axis and closer to the body front than to the body transverse axis, and a starboard rear engine that is secured to the substantially planar starboard side of the vehicle body between the body transverse axis and the body rear and closer to the body rear than to the body transverse axis; wherein the port front engine and the port rear engine are aligned relative to one another in a manner that is substantially parallel to the body longitudinal axis; wherein the starboard front engine and the starboard rear engine are aligned relative to one another in a manner that is substantially parallel to the body longitudinal axis; and wherein each engine is movable in two degrees of freedom, each engine including a fan blade assembly, a fan motor that provides a force to rotate the fan blade assembly to generate thrust, and a fan positioner that selectively moves the fan blade assembly and the fan motor relative to the vehicle body, the fan positioner including a pitch actuator that adjusts an angle of thrust about a first axis and a yaw actuator that adjusts the angle of thrust about a second axis that is different from the first axis;

a battery assembly that provides power to the propulsion assembly, the battery assembly being secured to the vehicle body;

a vehicle control system that is electrically connected to the propulsion assembly and that is secured to the vehicle body; and a remote control system that sends signals to the vehicle control system to control the propulsion assembly, wherein the remote control system is adapted to be controlled by the user who is positioned remotely from the air vehicle.

9. An air vehicle comprising:

a vehicle body having the shape of a wing airfoil so that the vehicle body generates lift when air flows over the vehicle body; the vehicle body having an outer skin including a body front, a body rear, a substantially planar port side, and a substantially planar starboard side that is substantially parallel to the port side, the substantially planar port side and the substantially planar starboard side being formed from composite material; the vehicle body having a body length that extends from the body front to the body rear, and a body longitudinal axis that extends parallel to the body length; the vehicle body including a first hull, a second hull, and a third hull, the hulls being positioned adjacent to one another and secured to one another in a side-by-side manner, each hull defining a separate fluid chamber that is filled with a fluid that is at least partially buoyant, and each hull including a substantially planar first side wall and an opposed, substantially planar second side wall that are substantially parallel to one another, the side walls of each hull being substantially parallel to the side walls of each of the other hulls, and wherein the first side wall or the second side wall of each of the hulls is formed from composite material; and a propulsion assembly including a plurality of engines that are secured to the vehicle body, the propulsion assembly generating thrust to move the vehicle body, the propulsion assembly including a port front engine that is secured to the substantially planar port side, a port rear engine that is secured to the substantially planar port side, a starboard front engine that is secured to the substantially planar starboard side, and a starboard rear engine that is secured to the substantially planar starboard side, wherein at least two of the engines have independently controlled thrust vectors.

10. The air vehicle of claim 9 wherein the first hull has a first hull longitudinal axis, the second hull has a second hull longitudinal axis, and the third hull has a third hull longitudinal axis, the first hull longitudinal axis, the second hull longitudinal axis and the third hull longitudinal axis being substantially parallel to the body longitudinal axis.

11. The air vehicle of claim 9 further comprising a secondary bladder that is positioned within each hull of the vehicle body and substantially adjacent to the vehicle body, wherein each secondary bladder can be selectively inflated to maintain the shape of the respective hull.

12. The air vehicle of claim 9 wherein the vehicle body further includes a body transverse axis positioned halfway between the body front and the body rear;

wherein the port front engine is secured to the substantially planar port side of the vehicle body between the body front and the body transverse axis, the port rear engine is secured to the substantially planar port side of the vehicle body between the body transverse axis and the body rear, the starboard front engine is secured to the substantially planar starboard side of the vehicle body between the body front and the body transverse axis, and the starboard rear engine is secured to the substantially planar starboard side of the vehicle body between the body transverse axis and the body rear; and wherein each engine is movable in two degrees of freedom, each engine including a fan blade assembly, a fan motor that provides a force to rotate the fan blade assembly to generate thrust, and a fan positioner that selectively moves the fan blade assembly and the fan motor relative to the vehicle body, the fan positioner including a pitch actuator that adjusts an angle of thrust about a first axis and a yaw actuator that adjusts the angle of thrust about a second axis that is different from the first axis.

13. The air vehicle of claim 12 wherein each engine further includes a blade housing, the fan blade assembly being positioned substantially within the blade housing.

14. The air vehicle of claim 9 wherein each of the engines has independently controlled thrust vectors.

15. The air vehicle of claim 9 further comprising a vehicle control system that is electrically connected to the propulsion assembly and that is secured to the vehicle body, and a remote control system that sends signals to the vehicle control system to control the propulsion assembly, wherein the remote control system is adapted to be controlled by a user who is positioned remotely from the air vehicle.

16. The air vehicle of claim 9 further comprising a battery assembly that provides power to the propulsion assembly, the battery assembly being secured to the vehicle body.

17. The air vehicle of claim 16 further comprising a solar-collector that is formed on an upper surface of the vehicle body, the solar-collector being usable to recharge the battery assembly.

18. The air vehicle of claim 9 further comprising at least one substantially vertically-oriented stabilizer that is secured to the vehicle body and that cantilevers away from the vehicle body.

19. The air vehicle of claim 9 wherein the vehicle body has a rounded leading edge, a sharp trailing edge, and an upper surface and a lower surface each having asymmetric curvature so that the vehicle body generates lift when air flows over the vehicle body.

\* \* \* \* \*